Patented Oct. 10, 1933

1,929,489

UNITED STATES PATENT OFFICE 1,929,489

PROCESS OF TREATING PETROLEUM

Wright W. Gary, Beverly Hills, Calif., assignor of one-half to Charles O. Middleton, Beverly Hills, Calif.

No Drawing. Application July 16, 1928
Serial No. 293,085

1 Claim. (Cl. 196—40)

This invention relates to the treatment of petroleum in order to separate therefrom more particularly the sulfur compounds and to stabilize and improve the petroleum.

In my Patent No. 1,677,440, July 17, 1928, the petroleum is contacted with sulfuric anhydride, more particularly for the purpose of removing sulfur compounds or stabilizing and improving the petroleum. In the particular embodiments described in the specification, the sulfuric anhydride is maintained in a dry and gaseous state; the reaction products are then separated from the petroleum in any suitable manner as by settling or filtering. A process involving filtration is more particularly described in my Patent No. 1,893,138, Jan. 3, 1933.

I have discovered that in the treatment of petroleum and its products with sulfuric anhydride, upon the removal of the reaction products formed, small traces of these reaction products remain unseparated within the treated petroleum. Where the petroleum products are those of lower boiling points, more particularly those produced synthetically by the well known cracking process, these remaining unseparated reaction products partially prevent the full effect of the sulfuric anhydride treatment to a greater or less extent, according to the nature of the product under treatment. This is also true in certain cases where natural petroleum and its products are treated.

One of the objects of this invention, therefore, is to provide a process of treating petroleum and its products, particularly the products heretofore referred to, whereby the reaction products remaining unseparated after contacting with sulfuric anhydride and separation of the reaction products, are coagulated or otherwise affected, so as to facilitate their removal.

Further objects will appear from the detail description, in which will be set forth several embodiments of this invention; it will be understood, however, that this invention is susceptible of various embodiments other than those described and referred to, without departing from the spirit of this invention.

In accordance with one embodiment of this invention, the petroleum is contacted with sulfuric anhydride maintained in a dry and gaseous state, as described in Patent No. 1,677,440. The sulfuric anhydride may be diluted with a suitable medium such as air, as described in the patent and the temperature may be maintained above the condensation point of the treating gas or gas mixture, and below the dehydrogenation point of the petroleum. The treated petroleum may then be subjected to separation as by settling or filtering, in order to affect such degree of separation as is obtainable by settling or filtering methods. The remaining petroleum, secured by decantation, or as a filtrate, as the case may be, is now contacted with an agent adapted to coagulate or facilitate the removal of the remaining unseparated reaction products due to the contact of the petroleum with the sulfuric anhydride. An agent suitable for this purpose is sulfuric acid. The sulfuric acid is added to the remaining petroleum in such a manner as to secure intimate contact therewith. Since the purpose of this sulfuric acid is to coagulate or facilitate the removal of the remaining unseparated reaction products after a treatment with sulfuric anhydride, care should be taken that only sufficient of this coagulating agent is applied to facilitate the removal of these remaining unseparated reaction products, and the sulfuric acid should not be added in a sufficient quantity to appreciably react with the petroleum or other compounds contained therein, and which it is desired to retain unchanged. Excessive quantities of sulfuric acid may be detrimental in some cases and may even decompose and convert some of the reaction products and compounds within the petroleum into detrimental constituents. In certain other cases, for example cracked oils, sulfuric acid in a large quantity may react and remove certain constituents which are beneficial to the finished oil, thereby causing undue losses of both acid and oil; a notable example of this is the removal and waste of aromatic compounds of cracked gasolene which form the basis of non-detonating qualities.

In practice the petroleum remaining after contact with sulfuric anhydride and secured by decantation, or as a filtrate, is treated with sulfuric acid, added until a reasonably rapid settling of the sludge by coagulation of the remaining unseparated reaction products, takes place. The strength of the acid used depends to some extent upon the nature of the petroleum product to be treated. I have found that good results were obtained on gasoline by using a weak acid even as low as five percent sulfuric acid content. Generally, however, an acid of 66° Bé., will be found satisfactory. It is not, however, essential to use sulfuric acid as a coagulating agent for other agents may be used; in fact in some cases water in minute quantities has given the desired results.

After treatment of the remaining petroleum with the coagulating agent as heretofore described, the coagulated reaction products are separated in any suitable manner, as by allowing the same to settle followed by decantation. The decanted petroleum is then finished in any suitable manner well known to those skilled in the art.

The petroleum may be contacted with sulfuric anhydride in concentrated or undiluted form, as described in application, Ser. No. 293,086 or with liquid sulfuric anhydride as described in application, Ser. No. 293,087 both executed and filed of even dates herewith. The reaction products thus formed being separated as far as possible in any suitable manner, as by filtering, and the remaining unseparated reaction products being coagulated in the manner heretofore described. Such procedures are within the scope of this invention.

While, the processes embodying this invention are particularly applicable to the treatment of gasoline, it will be understood that this is applicable in many cases to other petroleum products, and petroleum in general. Furthermore, while certain theories have been advanced it will be understood that these have been for the purpose of facilitating the disclosure and not as being absolutely essential or necessary; it is, therefore, to be understood that this invention is not to be limited to any particular theory of operation. It is also obvious that various changes may be made in details without departing from the spirit of this invention; it is, therefore, to be understood that this invention is not to be limited to the specific details described.

Having thus described the invention, what is claimed is:

The process of treating petroleum comprising, contacting the petroleum with sulfuric anhydride maintained in a dry and gaseous state, separating the reaction products and contacting the remaining petroleum with an agent adapted to coagulate the remaining unseparated reaction products.

WRIGHT W. GARY.